(12) United States Patent
Sailer et al.

(10) Patent No.: US 8,984,132 B2
(45) Date of Patent: Mar. 17, 2015

(54) SYSTEM AND METHOD FOR SUPPORTING SECURE APPLICATION DEPLOYMENT IN A CLOUD

(75) Inventors: Anca Sailer, Yorktown Heights, NY (US); Sambit Sahu, Hawthorne, NY (US); Hidayatullah Shaikh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/356,293

(22) Filed: Jan. 23, 2012

(65) Prior Publication Data

US 2013/0191539 A1 Jul. 25, 2013

(51) Int. Cl.
*G06F 15/173* (2006.01)
*H04L 29/06* (2006.01)
*H04L 29/08* (2006.01)

(52) U.S. Cl.
CPC .................. *H04L 63/20* (2013.01); *H04L 67/10* (2013.01)
USPC .......................................... 709/225; 709/223

(58) Field of Classification Search
CPC .......... H04L 63/20; H04L 67/10; H04L 67/34
USPC ......................... 709/201–236; 713/145–156; 370/254–249
See application file for complete search history.

(56) References Cited

U.S. PATENT DOCUMENTS

| 7,716,109 | B1 * | 5/2010 | Jacobs et al. ..................... 705/37 |
| 7,844,998 | B2 * | 11/2010 | Kelley et al. ...................... 726/2 |
| 8,417,798 | B2 * | 4/2013 | Chen et al. ..................... 709/220 |
| 8,417,938 | B1 * | 4/2013 | Considine et al. ............ 713/151 |
| 2008/0080526 | A1 * | 4/2008 | Gounares et al. ............. 370/401 |
| 2010/0185968 | A1 | 7/2010 | Hsu et al. |
| 2011/0016214 | A1 | 1/2011 | Jackson |
| 2011/0231926 | A1 | 9/2011 | Ellis |

OTHER PUBLICATIONS

International Search Report Dated Apr. 9, 2013.

* cited by examiner

*Primary Examiner* — Mohamed Wasel
(74) *Attorney, Agent, or Firm* — F. Chau & Associates, LLC

(57) ABSTRACT

A method of securely deploying a software application in the Internet cloud including identifying those aspects of a software application that use secure data, and those aspects of the application that use non-secure data, deploying the secure data on one or more secure servers that are not publicly accessible over the Internet, and deploying non-secure data on one or more cloud servers that are publicly available over the Internet, where communication between the secure servers and the cloud servers is managed using secure connections with access only to computation results.

10 Claims, 4 Drawing Sheets

SYSTEM AND METHOD FOR SUPPORTING SECURE APPLICATION DEPLOYMENT IN A CLOUD

FIELD OF THE INVENTION

The present disclosure is directed to software application management in cloud computing environments.

BACKGROUND OF THE INVENTION

Cloud infrastructure services, also known as Infrastructure as a Service (IaaS), deliver computer infrastructure—typically a platform virtualization environment—as a service, along with raw (block) storage and networking. Rather than purchasing servers, software, data-center space or network equipment, clients instead buy those resources as a fully outsourced service. A powerful abstraction supported by cloud computing is resource level abstraction by means of virtualizing the underlying physical resources. In this paradigm, users are relieved of the trouble of owning and managing physical computing resources. Instead, users can request computing resources from cloud providers using the provider's exposed APIs. One such example is Amazon's EC2, through which users can gain access to the desired computing resources. The users do not have any control over the physical resources, as the cloud provider provides a set of virtualized resources, such as servers/CPUs, storage and network bandwidth. In such a computing model, users are required to prepare the virtual images that will host the applications, known as virtual appliances. The benefit of such a model is that users are unaware of the underlying physical computing resources and do not need to manage the physical resources. The user's focus is on managing applications on top of these virtual resources. Due to the sharing of a common set of physical resources that are isolated by virtualization technologies, cloud providers can significantly lower the cost of computing resources. However, a key concern of enterprise customers with respect to cloud computing arises due to the uneasiness in moving sensitive data to the cloud. This uneasiness can inhibit enterprises from moving applications to the cloud. In addition, several audit and conformance regulatory policies prevent many applications from utilizing the benefits of cloud computing environments.

SUMMARY OF THE INVENTION

Exemplary embodiments of the invention as described herein generally include methods and systems for supporting such application deployment in a cloud environment while allowing enterprise customers to leverage the advantages of cloud deployment.

According to an aspect of the invention, there is provided a method of securely deploying a software application in the Internet cloud including identifying those aspects of a software application that use secure data, and those aspects of the application that use non-secure data, deploying the secure data on one or more secure servers that are not publicly accessible over the Internet, and deploying non-secure data on one or more cloud servers that are publicly available over the Internet, wherein communication between the secure servers and the cloud servers is managed using secure connections with access only to computation results.

According to a further aspect of the invention, the method includes associating a point-of-delivery terminal with the secure data of the application to manage the secure data.

According to a further aspect of the invention, the method includes providing an access policy to generate an exception when an application event accesses secure data wherein the event that is accessing secure data is managed by the point-of-delivery terminal associated with the secure data of the application.

According to a further aspect of the invention, the method includes profiling the application to identify those aspects of the application that use secure data, and those aspects of the application that use non-secure data, wherein an application profiler generates an annotated graph that indicates which application components need to be deployed on said one or more secure servers.

According to a further aspect of the invention, the method includes deploying to said secure servers any other application or application components that needs to access secure data.

According to another aspect of the invention, there is provided a non-transitory program storage device readable by a computer, tangibly embodying a program of instructions executed by the computer to perform the method steps for securely deploying a software application in the Internet cloud.

DETAILED DESCRIPTION OF EXEMPLARY EMBODIMENTS

Figure 1:
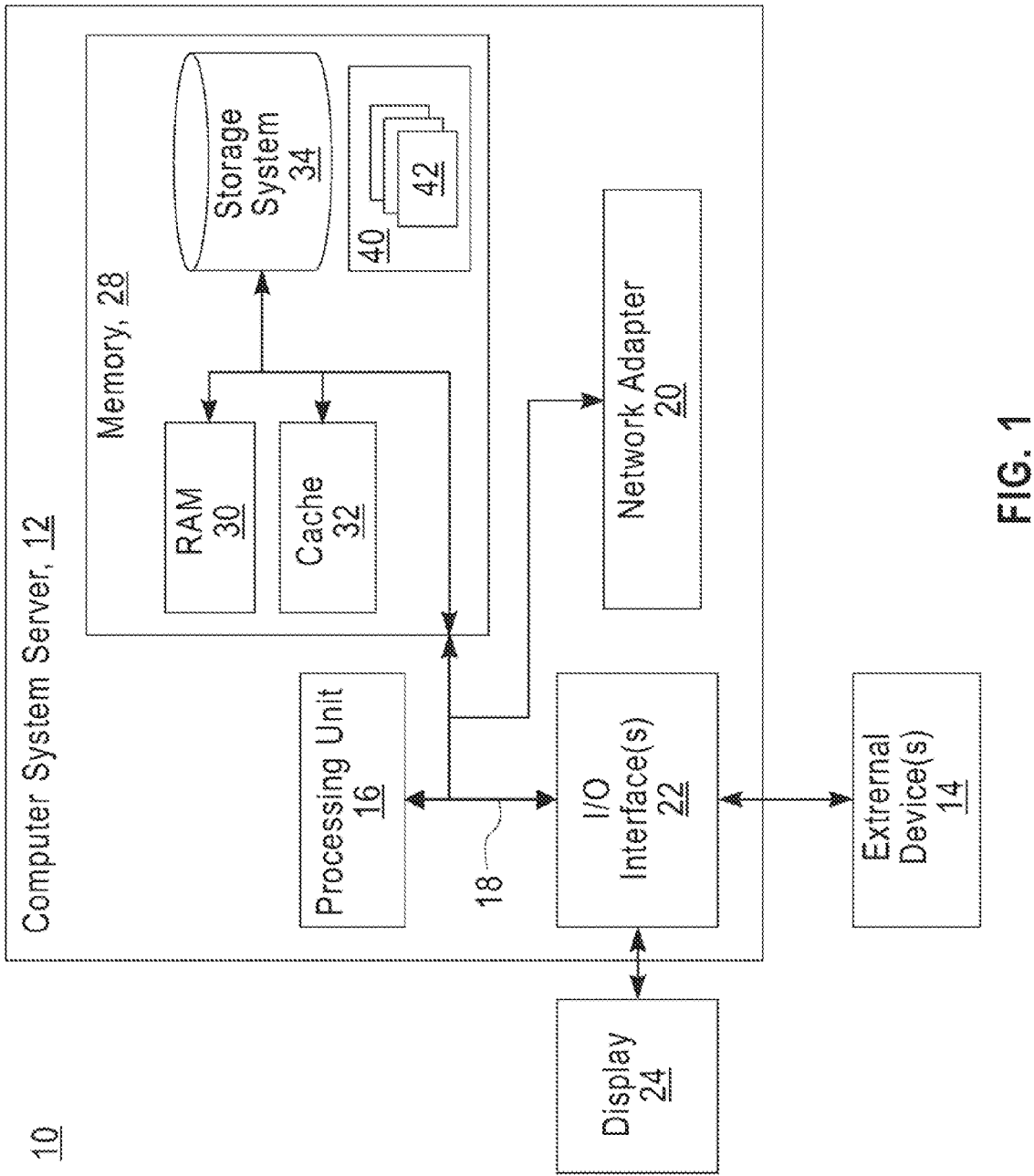
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adaptor 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
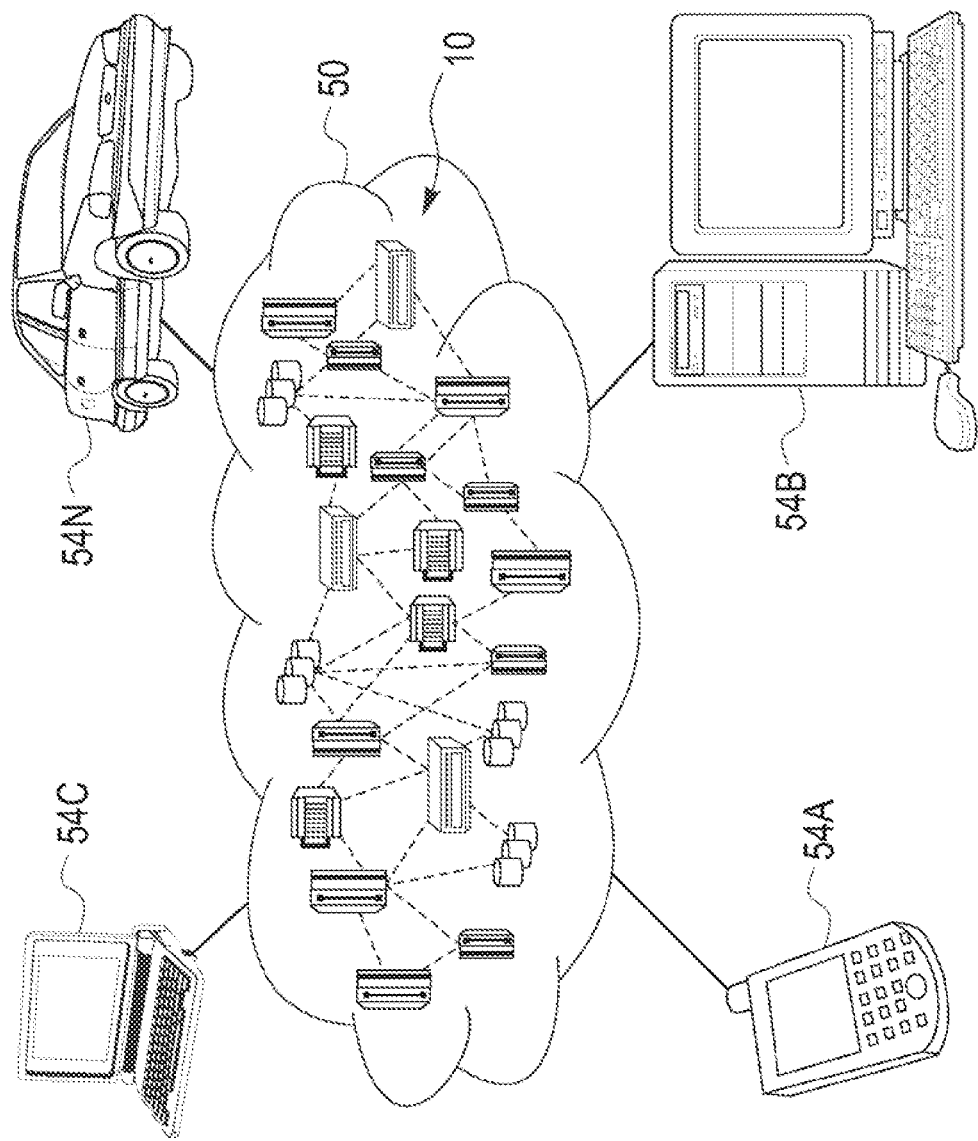
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
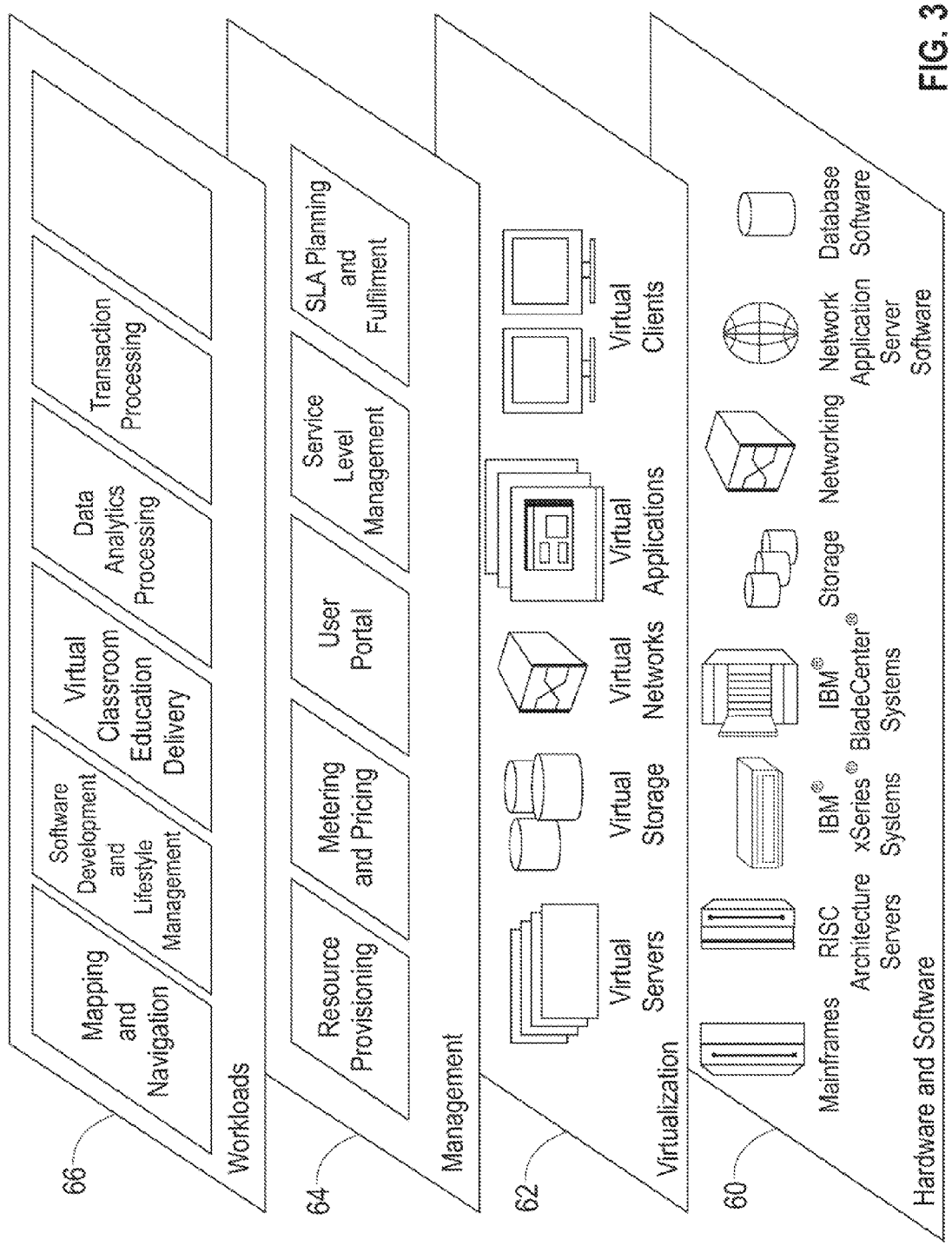
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

According to an embodiment of the invention, an enterprise customer can utilize cloud resources by selectively migrating applications and choosing those applications that use secure data within their own premises, and updating the cloud management center configuration such that these divided domains are seamlessly managed as a single cloud application. This deployment is facilitated by the underlying mechanism provided by the Modular Cloud design. A customer identifies part of their service that uses secure data and keeps that part of the services in their own premises. This part of the service, although hosted in the customer premises, is still part of the overall cloud application, which is supported by managing the configuration of the cloud management center. The secure data identified by the customer is marked, and policies are inserted into the application server software that mediates the customer's interaction with their data to generate an exception when accessing secure data, to invoke a secure handler to service the secure data transaction.

The steps involved in migrating an application to hybrid cloud architecture may be as follows. (1) Identify those service aspects that use secure data. The overall service is now separated into two domains: a secure domain, and a cloud domain. (2) Host the infrastructure for the secure domain inside the customer premises. (3) Host the cloud domain within the cloud infrastructure. (4) Manage communication between the secure domain and the cloud domain using secure connections with access only to computation results. (5) A cloud management center manages both domains by virtue of the modular support.

According to an embodiment of the invention, a point-of-delivery (POD) based cloud architecture can be used to orchestrate a hybrid cloud architecture. Each enterprise can deploy its own POD to handle secure applications and data, and add that POD to a cloud operations center (COC) that acts as an application server to user clients. Secure data and applications with security concerns may then be managed and deployed on this secure POD, while those non-secure parts of the applications may be hosted on public parts of the cloud. These split applications can communicate using well defined APIs.

Challenges in implementing such a hybrid cloud architecture include designing a control and management platform for seamless management of customer PODs and public PODs, and designing and splitting application management. In a POD based architecture for facilitating private and public cloud hybrid, the COC can be configured to manage both the private POD in a customer premise and the public PODs accessible over the internet. The COC can be appropriately configured to route and dispatch requests for secure applications to a private POD, and to manage other functions to facilitate communication between the private and public cloud.

In a split application topology, an enterprise customer can identify the part of its application deployment that needs to be in a private POD. Interfaces can serve as boundaries between secure and non-secure parts of the applications. Requests for secure applications may be sent to the COC for provisioning and management on a private POD, so that secure data need never pass through a customer boundary.

Options for deployment using a POD include splitting the application topology such that any component of the application that touches data or is related to data is hosted in a private POD, or restricting data access or computation in the private cloud while hosting the other application components on the public cloud where the split components communicate through the interface boundary.

Options for splitting the application include splitting an application at a functional level, splitting the middle infrastructure, and splitting the platform infrastructure. According to an embodiment of the invention, an application is split into secure and non-secure components at a highest level of granularity.

There are at least two challenges in splitting an application into secure and non-secure components. One is determining which components of the application should be kept inside customer premises so that all security concerns are addressed. Another involves providing seamless communication between the secure and non-secure components of the application. The second issue may be addressed by a modular cloud design concept, such as that disclosed in copending application YOR8-2009-0439 "Method and Apparatus for Building Modular Cloud".

With regard to the first challenge, the key issue for the split determination is that any component of the application(s) that touches secure data or has to communicate data deemed to be secure has to be hosted on infrastructure on the private cloud or a cloud designated as secure.

According to an embodiment of the invention, a best practices approach may be used. Best practices are typically enterprise application deployment guidelines developed by the application providers. One approach would be to mark and designate application components as "secure-only" for those components that access databases that are marked secure. The secure and non-secure components are moved to the private and public cloud, respectively. Data communication is facilitated by established communication channels in the POD based architecture.

According to another embodiment of the invention, users may mark the application components and data sources as secure and non-secure.

According to another embodiment of the invention, automated profiling can be used to trace the data flow across applications and application components to determine which ones should be marked as secure and non-secure. In this case an application graph is annotated to find those components the need to be securely deployed. The annotated graph will indicate which components need to be deployed on a secure cloud. Commercially available software programs such as eConfigure from Hewlett Packard can use this model to define a deployment plan.

These methods provide a split based on the direct dependency on secure data. There may be derived dependencies as other applications that depend on these applications may expose data to the public cloud, so these applications should be marked as secure as well. An algorithm according to an embodiment of the invention for this derived dependency is: (1) Place components marked as secure on a secure POD; (2) Any component that needs to access components in the secure POD but is unable to do so should be placed into the secure POD; and (3) Repeat step (2) until all such requirements resolved.

It is to be understood, however, that a POD architecture is but one implementation for facilitating the above splitting of into secure and non-secure components, and other embodiments of the invention are not limited to a POD based design. Methods according to other embodiments of the invention can utilize other combinations of private and public cloud platforms, or more generally other combinations of secure and non-secure cloud components where sensitive data and applications accessing such data are kept and limited to a secure cloud. The management control and communication between secure and non-secure components can be facilitated by respective supported designs in those clouds.

Figure 4:
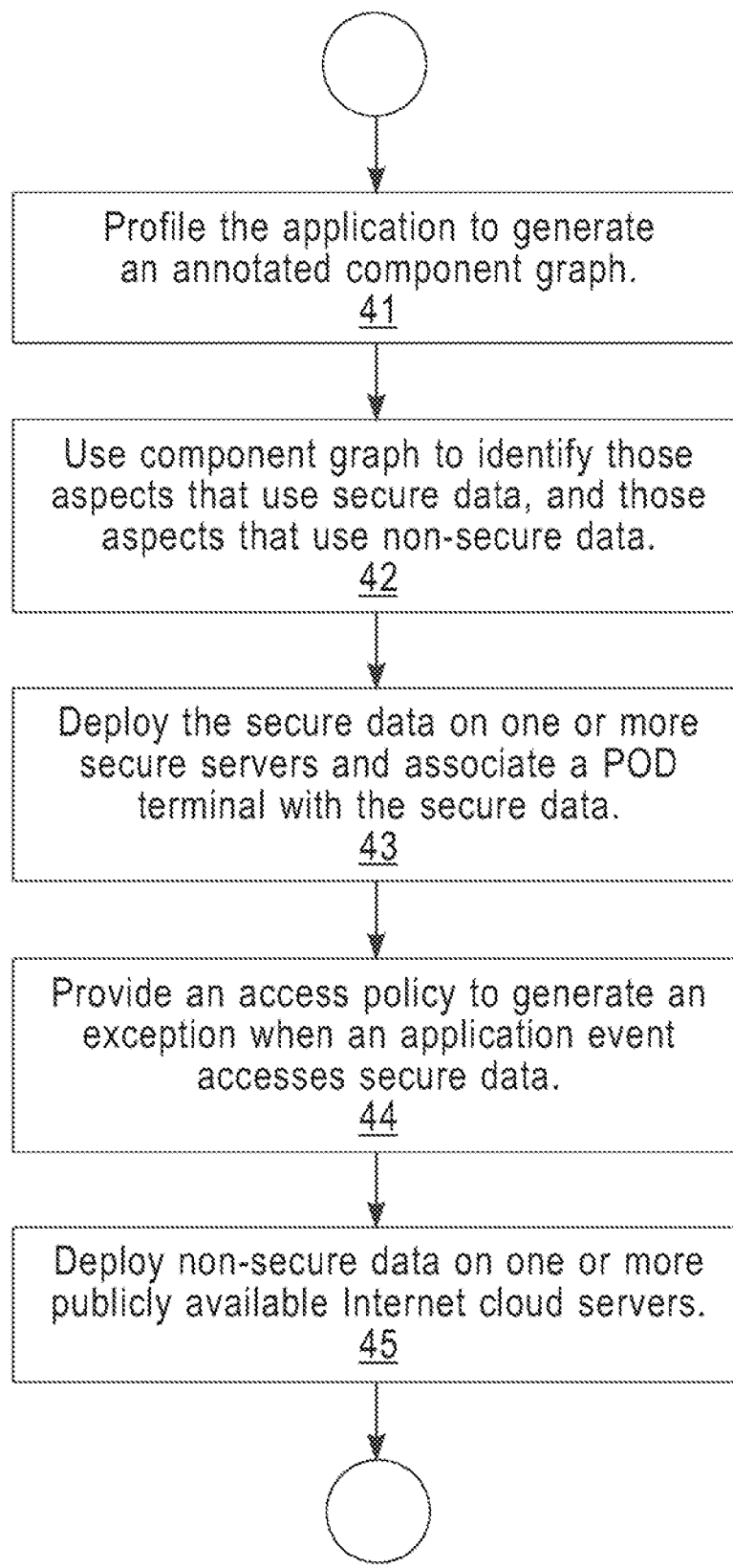
FIG. 4 is a flowchart of a method for supporting secure application deployment in the cloud, according to an embodiment of the invention.

FIG. 4 is a flowchart of a method according to an embodiment of the invention for securely deploying a software application in the Internet cloud. Referring now to the figure, a method according to an embodiment of the invention begins at step 41 by profiling the application to generate an annotated component graph to identify those aspects of the application that use secure data, and those aspects of the application that use non-secure data. At step 42, the annotated component graph is used to identify those aspects of the application that use secure data, and those aspects of the application that use non-secure data. The secure data is deployed at step 43 on one or more secure servers that are not publicly accessible over the Internet, and a point-of-delivery (POD) terminal is associated with the secure data of the application to manage the secure data. In addition, any other application or application components that needs to access secure data are deployed to the secure servers. An access policy is provided at step 44 to generate an exception when an application event accesses secure data. The event that is accessing secure data would be managed by the point-of-delivery terminal associated with the secure data of the application. At step 45, the non-secure data is deployed on one or more publicly available Internet cloud servers. Communication between the secure servers and the cloud servers is managed using secure connections with access only to computation results.

While exemplary embodiments of the invention has been described in detail with reference to the attached drawing figures, those skilled in the art will appreciate that various modifications and substitutions can be made thereto without departing from the spirit and scope of the embodiments of the invention as set forth in the appended claims.

What is claimed is:

1. A method of securely deploying a software application in the Internet cloud, comprising the steps of:
identifying those aspects of a software application that use secure data, and those aspects of the application that use non-secure data;
deploying the secure data on one or more secure servers that are not publicly accessible over the Internet; and
deploying non-secure data on one or more cloud servers that are publicly available over the Internet,
wherein communication between the secure servers and the cloud servers is managed using secure connections with access only to computation results.

2. The method of claim 1, further comprising associating a point-of-delivery terminal with the secure data of the application to manage the secure data.

3. The method of claim 2, further comprising providing an access policy to generate an exception when an application event accesses secure data wherein the event that is accessing secure data is managed by the point-of-delivery terminal associated with the secure data of the application.

4. The method of claim 1, further comprising profiling the application to identify those aspects of the application that use secure data, and those aspects of the application that use non-secure data, wherein an application profiler generates an annotated graph that indicates which application components need to be deployed on said one or more secure servers.

5. The method of claim 4, further comprising deploying to said secure servers any other application or application components that needs to access secure data.

6. A non-transitory program storage device readable by a computer, tangibly embodying a program of instructions executed by the computer to perform the method steps for securely deploying a software application in the Internet cloud, comprising the steps of:
identifying those aspects of a software application that use secure data, and those aspects of the application that use non-secure data;
deploying the secure data on one or more secure servers that are not publicly accessible over the Internet; and
deploying non-secure data on one or more cloud servers that are publicly available over the Internet,
wherein communication between the secure servers and the cloud servers is managed using secure connections with access only to computation results.

7. The computer readable program storage device of claim 6, the method further comprising associating a point-of-delivery terminal with the secure data of the application to manage the secure data.

8. The computer readable program storage device of claim 7, the method further comprising providing an access policy to generate an exception when an application event accesses secure data wherein the event that is accessing secure data is managed by the point-of-delivery terminal associated with the secure data of the application.

9. The computer readable program storage device of claim 6, the method further comprising profiling the application to identify those aspects of the application that use secure data, and those aspects of the application that use non-secure data, wherein an application profiler generates an annotated graph that indicates which application components need to be deployed on said one or more secure servers.

10. The computer readable program storage device of claim 9, the method further comprising deploying to said secure servers any other application or application components that needs to access secure data.

* * * * *